Figure 1:
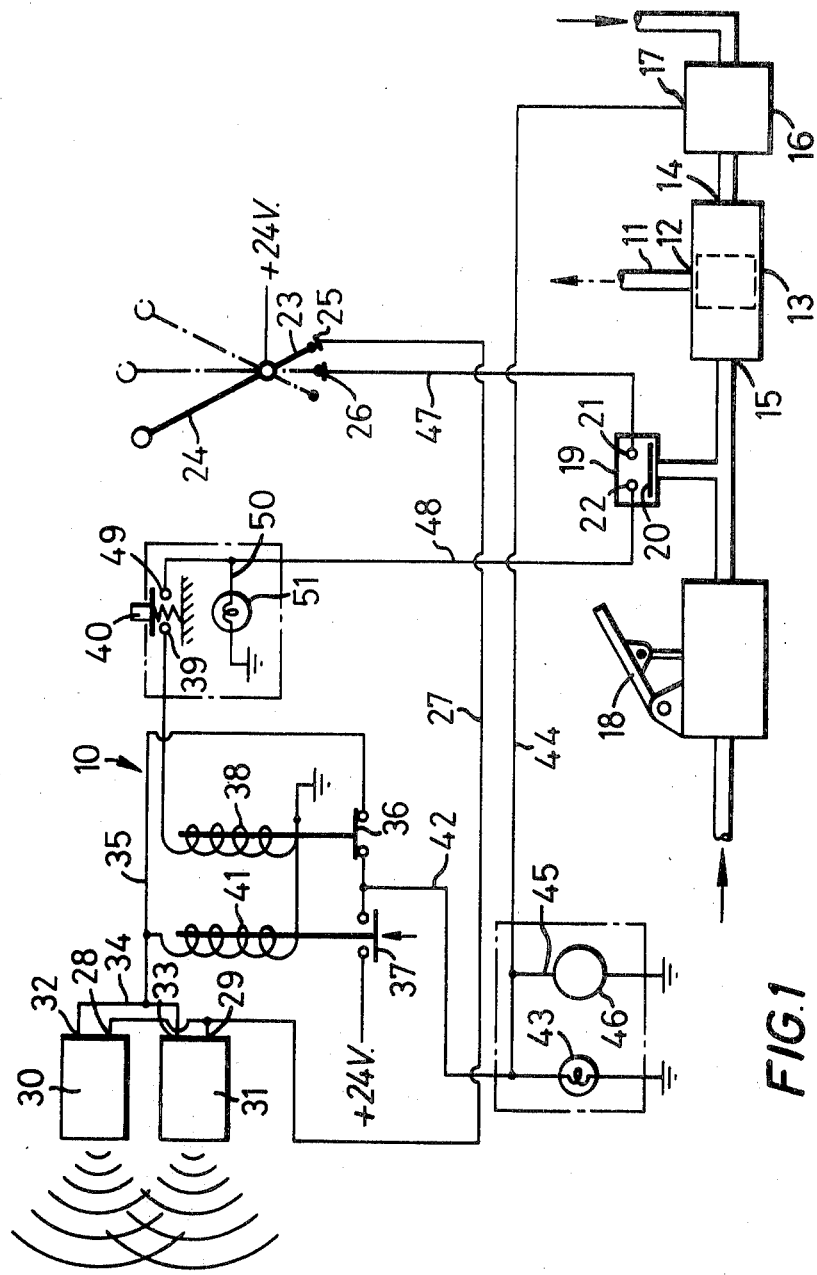

United States Patent [19]

Steel

[11] 4,407,388
[45] Oct. 4, 1983

[54] COLLISION PREVENTION SYSTEM

[75] Inventor: James Steel, Newcastle Upon Tyne, England

[73] Assignee: Ogden Electronics, Ltd., Yorkshire, England

[21] Appl. No.: 242,523

[22] Filed: Mar. 11, 1981

[30] Foreign Application Priority Data

Mar. 19, 1980 [GB] United Kingdom ............... 8009244
Sep. 25, 1980 [GB] United Kingdom ............... 8030904

[51] Int. Cl.³ .............................................. B60T 7/12
[52] U.S. Cl. ................................. 180/271; 180/169; 180/275; 188/110; 340/52 B; 340/70
[58] Field of Search ............... 180/167, 169, 274, 275, 180/273, 271; 340/32, 52 B, 53, 69, 70, 552; 188/110

[56] References Cited

U.S. PATENT DOCUMENTS

| 3,011,580 | 12/1961 | Reid | 180/169 |
|---|---|---|---|
| 3,059,716 | 10/1962 | Iserman et al. | 180/275 |
| 3,514,610 | 5/1970 | Huston et al. | 250/286 |
| 3,749,197 | 7/1973 | Deutsch | 180/169 |
| 3,905,441 | 9/1975 | Kawata | 180/169 |
| 4,136,752 | 1/1979 | Friesen et al. | 180/273 |

FOREIGN PATENT DOCUMENTS

| 2312248 | 9/1974 | Fed. Rep. of Germany . |
|---|---|---|
| 2334904 | 1/1975 | Fed. Rep. of Germany . |
| 2518930 | 11/1976 | Fed. Rep. of Germany . |
| 2427221 | 12/1979 | France . |

Primary Examiner—Joseph F. Peters, Jr.
Assistant Examiner—Michael Mar
Attorney, Agent, or Firm—Cushman, Darby & Cushman

[57] ABSTRACT

Apparatus for controlling movement of a heavy vehicle used in the mining and construction industries comprises a radar scanner (30) and an infra red detector (31) mounted at the rear of the vehicle for detecting a hazard in the path of the vehicle while reversing and a control system (10) responsive to the detection devices (30, 31) for controlling supply of air in a pneumatic supply system (11) of a retarder of the vehicle when a hazard is detected by the detection means (30, 31). The control system (10) includes driver operable apparatus (19, 23 and 40) for releasing the retarder.

2 Claims, 2 Drawing Figures

COLLISION PREVENTION SYSTEM

DESCRIPTION

This invention relates to apparatus for preventing a moving object from colliding with another object and has particular reference to motor vehicles in which at least a portion of a field of view of the driver of the vehicle is obscured.

It is known in the mining and construction industries to use large dump trucks for transporting loads. Such vehicles may have a load carrying capacity of, for example, 85 tons. Each load is carried in a container, or skip, which is a component of the vehicle and which is pivotable relative to a body of the vehicle so that a load contained in the skip may be deposited on ground to the rear of the vehicle. Although such vehicles are provided with wing mirrors to enable a driver to reverse a vehicle to a location at which a load is to be deposited, there is generally no field of view directly to the rear of the vehicle because the skip is located behind the driver's cab of the vehicle and extends above the cab. In consequence, reversal of vehicles often results in collision with objects in the path of the vehicles and of which the drivers of the vehicles are unaware because the objects are obscured from the drivers' field of vision.

In order to reduce the possibility of collision and consequential damage, it has been the practice for an assistant to stand to the rear and to one side of a vehicle so that, on reversal of the vehicle, the assistant can signal to the driver and thereby assist the driver in carrying out a reversal manoeuvre. However, such practice is found to be hazardous when many vehicles are carrying out similar reversal manoeuvres closely adjacent one another because drivers are not always aware of the presence of other drivers' assistants and accidents have occured involving unseen pedestrians being struck by the rear of a vehicle during reversal.

A further hazard experienced in the mining and construction industries occurs when a load carried in a skip of a vehicle is to be deposited adjacent an edge of a cliff so that a load subsequently can be bulldozed over the edge of the cliff into a ravine. Such a procedure is common practice when it is required to fill a ravine. However, it is known for accidents to occur involving loss of dump trucks which fail to stop when reversing towards a cliff edge.

It is desirable, therefore, to provide means for detecting the presence of an object in an obscured portion of a field of view of a driver of a vehicle when the vehicle is being driven in a path towards the object and when the object is within a predetermined boundary extending beyond the vehicle and with which object the vehicle would collide if continuing to move along the path, and means adapted to operate the brakes of the vehicle independently of the driver in the event of an object being detected. Furthermore, it is desirable to provide such means whereby the brakes of the vehicle also are automatically operated if the vehicle approaches too closely a cliff edge.

In accordance to the present invention, there is provided apparatus for controlling movement of a vehicle comprising detection means for detecting a hazard in a path of a vehicle and control means responsive to the detection means for controlling retarding means of a vehicle when a hazard is detected by the detection means, the control means including release means for releasing the retarding means so that release of the retarding means operated in response to a hazard detected by the detection means is effected to permit movement of the vehicle in a predetermined path only after said release means has been operated.

The control means may comprise an electrical circuit and the release means may comprise a switch of the circuit adapted for manual control.

In this specification the expression "manual control" means control by human intervention and may include operation by a human limb, such as hand or a foot.

The circuit may include a plurality of said switches.

At least two or more of said switches may be arranged to be operated simultaneously to effect release of the retarding means.

At least one of said switches may be controlled by operation of the gear selector of the vehicle.

At least one of said switches may be operable by a pedal of the vehicle.

The control means may further include indicator means for indicating when the detection means detects a hazard, the control means being adapted to control the indicator means so that the indicator means is activated when a hazard is detected and is deactivated when the retarding means is released.

The indicator means may be adapted to generate audio and visual signals.

The detection means may comprise radar apparatus.

The detection means may also comprise a scanner for detecting radiation in the infra red portion of the spectrum.

Following is a description, by way of example only and with reference to the accompanying drawings, of one method of carrying the invention into effect.

Figure 2:
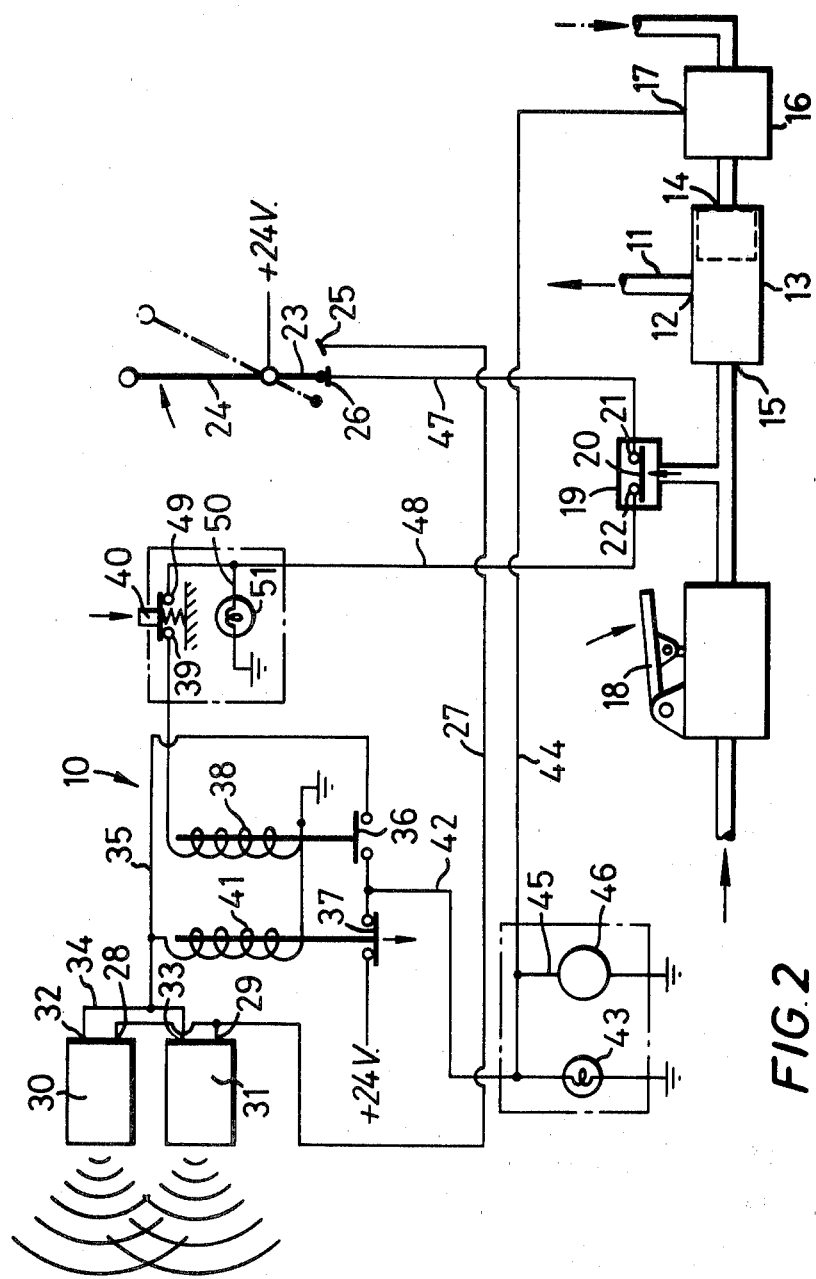

In the drawings;

FIG. 1 is a diagramatic representation of one embodiment of apparatus in accordance with the present invention installed on a vehicle and in a condition during reversal of a vehicle prior to a hazard being detected by the apparatus, and FIG. 2 is a diagramatic representation of the embodiment shown in FIG. 1 subsequent to the apparatus having detected a hazard and at an instant prior to release of retarding means of the vehicle.

Referring now to the drawings, there is shown apparatus 10 for controlling movement of a vehicle (not shown). The vehicle is provided with a retarder (not shown) operable by compressed air supplied thereto through a conduit 11 connected to an outlet 12 of a slide valve 13. The slide valve 13 is connected in an air supply circuit for supplying compressed air to a first inlet 14 of the slide valve 13 and to a second inlet 15 of the slide valve 13. Supply of air to the first inlet 14 of the slide valve 13 is controlled by an electrically operated emergency brake valve 16 when a voltage is supplied to a terminal 17 of the valve 16. Supply of air to the second inlet 15 of the slide valve 13 is controlled by operation of a brake pedal 18 of the vehicle and the supply is directed from the brake pedal 18 to the second inlet of the slide valve by way of a pressure switch 19. The brake pedal 18 is arranged to permit compressed air to pass towards the inlet 14 of the slide valve 13 only on depression of the brake pedal. The pressure switch 19 includes an electrically conductive bridging portion 20 and two spaced terminals 21, 22 which are connected by the bridging portion 20 when compressed air is supplied to the switch 19 forcing the bridging portion 20 against the terminals 21, 22. Supply of fluid to either the first inlet 14 of the slide valve 13 or the second inlet 15 of the slide valve results in fluid being supplied to the retarder through the outlet 12 and the conduit 11.

The apparatus 10 further comprises an electrical circuit comprising a switch 23 operable by a gear lever 24 of the vehicle. The switch 23 is connected to a +24 volt supply and is engagable with a terminal 25 when the gear lever 24 is in a "reverse" position and a terminal 26 when the gear lever is in a "neutral" position. The terminal 25 is connected to one end of a line 27 the other end of which is connected to an input terminal 28 of a radar scanner 30 and an input terminal 29 of an infra red detector 31. An output terminal 32 of the scanner 30 and an output terminal 33 of the detector 31 are connected in parallel by a line 34 which is tapped by a line 35. The line 35 contains two switch contacts 36, 37 and is connected to a +24 volt supply. The contact 36 is normally closed and is operated by a solenoid 38, one end of the coil of which is connected to a terminal 39 of a "cancel" switch 40 and the other end of which is earthed. The contact 37 is normally open and is operated by a solenoid 41 one end of the coil of which is tapped to the line 35 and the other end of which is earthed. The line 35 is tapped between the contacts 36, 37 by a line 42 which is connected to an "emergency" lamp 43. The line 42 is tapped by a line 44 which is connected to the terminal 17 of the valve 16. The line 44 is tapped by a line 45 which is connected to a siren 46.

The terminal 26 of the switch 23 is connected by a line 47 to the terminal 21 of the pressure switch 19. The terminal 22 of the pressure switch is connected by a line 48 to a second terminal 49 of the "cancel" switch 40. The line 48 is tapped by a line 50 which is connected to a "cancel" lamp 51.

Assuming that the vehicle is reversing, the gear lever 24 of the vehicle will be in the "reverse" position, as shown in FIG. 1, and a circuit will be completed from the +24 volt supply through the switch 23 and the line 27 to the scanner 30 and the infra red detector 31 to set the scanner and the detector each in an operating mode. If the radar detects the presence of an object, whether moving or not, within predetermined perameters which would indicate collision with the object if the vehicle continues to reverse in the given path, or the absence of a signal in the event that the vehicle has approached too closely a cliff edge, and if the infra red detector detects a hot body also within predetermined perameters then, in the case of either or both, signals are received at either or both of the respective output terminals 32, 33. In consequence, a signal is directed along line 35 causing energisation of the solenoid 41 and consequential closing of the contact 37. The contact 37 is held on due to the +24 volt supply to line 35. The voltage supply is distributed to the "emergency" lamp 43 and the siren 46 through lines 42 and 44 causing the lamp 43 to illuminate and the siren 46 to sound. The voltage supply along the line 44 to the terminal 17 of the emergency brake valve 16 causes operation of the valve 16 with a result that air is supplied to the inlet 14 causing the slide valve 13 to operate and pressure to be directed to the retarder through the outlet 12 of the slide valve 13 and the conduit 11. In consequence, the vehicle is brought to a halt by the retarder and the retarder continues to be applied, even through signals may no longer continue to emanate at the output terminals 32, 33 of the radar scanner 30 and the infra red detector 31, because the contact 37 continues to be held on by the solenoid 41 which continues to be energised.

The apparatus 10 is reset by carrying out a sequence of steps which commence with movement of the gear lever 24 to a "neutral" position, as shown in FIG. 2, in which the switch 23 is moved from engagement with the terminal 25 to engagement with the terminal 26 and a voltage supply is directed along the line 47 to the terminal 21 of the pressure switch 19. Operation of the pressure switch 19 is effected when the foot brake 18 is operated thereby supplying compressed air to the switch 19 causing the bridging portion 20 to engage and bridge the terminals 21, and 22 of the switch. In consequence, voltage is supplied to the "cancel" lamp 51 by way of the line 48. The "cancel" switch 40 should be operated simultaneously with operation of the foot brake 18 so that voltage is supplied to the solenoid 38 thereby energising the solenoid with a result that the switch contact 36 is opened. The effect of opening switch 36 is to cut off voltage supply to the solenoid 41 with a result that the switch contact 37 is opened and voltage supply to the "emergency" lamp 43, the siren 46 and the emergency brake valve 16 is cut off. The "emergency" lamp therefore is extinguished and the siren switched off. The emergency brake valve 16 is deactivated and supply of compressed air to the slide valve 13 through the inlet 14 is cut off.

However, operation of the pressure switch 19 was only possible by operation of the brake pedal 18. In consequence, cut off of supply of compressed air at the inlet 14 of the slide valve 13 is compensated for by equal pressure being applied to the inlet 15 of the slide valve 13 causing a piston of the slide valve to operate whereby supply of compressed air through the inlet 15 passes through the outlet 12 and the conduit 11 to the retarder. In this manner, the retarder continues to be applied but is under the control of the driver of the vehicle and control of the vehicle has been shifted from a "reverse" mode.

It will be appreciated that, with apparatus in accordance with the present invention reversal of a vehicle is arrested by the retarder if the detection means, being either or both of the radar scanner 30 and the infra red detector 31, detect a hazard in a path of the vehicle and that the retarder is released only when the driver takes over control of the vehicle by moving the gear lever thereof into a "neutral" position and simultaneously operating a foot brake of the vehicle and a "cancel" switch.

In this manner, the vehicle is automatically retarded in the event of there being a hazard in the path of a vehicle but the vehicle can be subsequently operated only after the driver has taken over control of the vehicle.

I claim:
1. Apparatus for automatically controlling the braking system of a vehicle which vehicle includes a manually actuated foot brake pedal and a gear shift lever, said apparatus comprising:
   hazard detection means for detecting a hazard in the rearward path of the vehicle while the gear shift lever is placed in a reverse gear position and for producing a control output in response to such detection;
   automatic brake actuation means connected to respond to said control output for automatically actuating said braking system and maintaining said braking system in the actuated mode to thus retard motion of the vehicle; and manual reset control means for deactuating said automatic brake actuation means including
- a manually actuatable cancel switch means,
- a brake pedal actuated switch means, and
- a gear shift lever actuated switch means connected in circuit with said other switch means and with control means for effectively deactivating and resetting said automatic brake actuation means only when (a) the gear shift lever has been manually moved out of a reverse gear position, (b) the brake pedal has been actuated, and (c) the cancel switch means has been actuated.

2. Apparatus for automatically controlling the braking system of a vehicle which vehicle includes a manually actuated foot brake pedal and a gear shift lever, said apparatus comprising:

hazard detection means for detecting a hazard in the path of the vehicle while the gear shift lever is placed in a reverse gear position and for producing a control output in response to such detection;

automatic brake actuation means connected to respond to said control output for automatically actuating said braking system and maintaining said braking system in the actuated mode to thus retard motion of the vehicle; and manual reset control means for deactuating said automatic brake actuation means including
- a manually actuatable cancel means,
- a gear shift lever actuated means, and
- control means operatively associated therewith and with said brake pedal for effectively deactivating and resetting said automatic brake actuation means only when (a) the gear shift lever has been manually moved out of a reverse gear position, (b) the brake pedal has been actuated, and (c) the cancel means has been actuated.

* * * * *